United States Patent [19]
Yokomizo et al.

[11] Patent Number: 5,717,345
[45] Date of Patent: Feb. 10, 1998

[54] SIGNAL TRANSMISSION CIRCUIT AND SIGNAL TRANSMISSION DEVICE UTILIZING THE SAME

[75] Inventors: Koichi Yokomizo; Kuniharu Hirose; Kazuo Ikeda; Takao Hirakoso, all of Tokyo, Japan

[73] Assignee: Oki Electric Industry Co., Ltd., Tokyo, Japan

[21] Appl. No.: 364,188

[22] Filed: Dec. 27, 1994

[30] Foreign Application Priority Data

Dec. 28, 1993 [JP] Japan .................. 5-338216
Dec. 13, 1994 [JP] Japan .................. 6-311807

[51] Int. Cl.$^6$ ............... H03K 19/0175; H03K 17/16
[52] U.S. Cl. ..................... 326/80; 326/86; 326/30
[58] Field of Search ................ 326/30, 86, 90, 326/80, 68

[56] References Cited

U.S. PATENT DOCUMENTS

| | | | |
|---|---|---|---|
| 5,019,728 | 5/1991 | Sanwo et al. | 326/30 |
| 5,179,299 | 1/1993 | Tipon | 326/86 |
| 5,469,082 | 11/1995 | Bullinger et al. | 326/86 |
| 5,491,432 | 2/1996 | Wong et al. | 326/86 |
| 5,519,728 | 5/1996 | Kuo | 326/86 |
| 5,559,448 | 9/1996 | Koenig | 326/86 |
| 5,570,037 | 10/1996 | Llorens | 326/86 |
| 5,585,740 | 12/1996 | Tipon | 326/86 |

FOREIGN PATENT DOCUMENTS 3-171849  7/1991  Japan .

*Primary Examiner*—Edward P. Westin
*Assistant Examiner*—Richard Roseen
*Attorney, Agent, or Firm*—Rabin, Champagne & Lynt, P.C.

[57] ABSTRACT

A signal transmission circuit employing a signal transmitting circuit and a signal receiving circuit. The signal transmitting circuit transfers received signals from an input terminal, through transmission lines, to the signal receiving circuit. The signal transmitting circuit incorporates thereinto a control circuit which operates with the first power source having the first voltage and provides an inverted/non-inverted output in accordance with the first power source, and a pair of the first and the second push-pull type drivers which feed the inverted/non-inverted output from the control circuit. The first and the second push-pull type drivers operate with the second power source having the second voltage lower than the first voltage and transmit complementary transmitting signals having values corresponding to the second voltage corresponding to the input signal driven by the control circuit through the transmission lines.

31 Claims, 6 Drawing Sheets

5,717,345

SIGNAL TRANSMISSION CIRCUIT AND SIGNAL TRANSMISSION DEVICE UTILIZING THE SAME

CROSS REFERENCE TO RELATED APPLICATIONS

This application claims the priority right under 35 U.S.C. 119, of Japanese Patent Applications No. Hei 05-338216 filed on Dec. 28, 1993, and No. Hei 06-311807 filed on Dec. 15, 1994, the entire disclosures of which are incorporated herein by reference.

BACKGROUND OF THE INVENTION

1. Field of the Invention

The present invention relates to a signal transmission circuit, and more particularly, to a signal transmission circuit and a signal transmission device utilizing the same which transmits or receives digital signals through a transmission medium such as a twisted pair of lines or the like.

2. Description of the Related Art

Transmission or receiving of digital signals has been made, in a digital processing device or between each of the functional blocks of the device which are constituted, for example, of CMOS transistors, in such a manner that bipolar ICs are disposed in a transmitter to be used as driver circuits for transmission signals. This is because a CMOS circuit has a small current driving capacity so that if a capacitive load is large, the signal transmission delay time will be large.

As described above, when the bipolar ICs are utilized as the driver circuits, there has been such a problem that not only a circuit scale has been expanded due to an increase in the number of parts which constitute the circuits, but also a power consumption has increased due to a necessity for a large driving current. In order to solve the above problem, there has been disclosed one of the conventional technologies in, for example, Japanese Patent Laid-Open Publication No. Hei 03-171849, which eliminates such bipolar ICs. In the above technology, a resistor having a prescribed value is inserted in series in a transmission line of the transmission circuit to provide the receiver with high impedance, thereby enabling to be accomplished a high speed signal transmission even with an output circuit, such as a CMOS circuit constituted of MOS FETs, which has a small current driving capacity.

The above conventional technology has, however, caused such a problem that the power consumption has increased if a signal transmission circuit in use for multiple bits is constituted of a plurality of signal transmission circuits. This is because even though the power consumption is not so large in the CMOS circuit as compared to that in the bipolar IC, the power consumption becomes large due to resistors inserted in series in the transmission line, since the power source voltage supplied to the driver circuits of the transmitting circuit becomes large. Accordingly, the power consumption is not negligibly small in the conventional signal transmission circuit when the multiple signal transmissions are performed, so that difficulties have been faced to reduce the power consumption of the entire transmission device.

SUMMARY OF THE INVENTION

It is an object of the present invention to provide a signal transmission circuit and a signal transmission device utilizing the same therein, which enable a remarkable reduction in the power consumption caused by a current which flows through a transmission line.

To accomplish the above object, there is provided a signal transmission circuit having a signal receiving circuit to which an input signal is transmitted through a transmission line, comprising: a) a first power supply source having a first power source voltage; b) a second power supply source having a second power source voltage; c) a third power supply source having a third power source voltage; the second power source voltage being lower than the first power source voltage and higher than the third power source voltage; and d) a signal transmitting circuit having a control circuit for driving the input signal with the first power source voltage and a driver circuit for outputting the input signal driven by the control circuit with a voltage based on the second power source voltage; the control circuit being connected to the first power supply source and the driver circuit being connected to the second power supply source.

According to another aspect of the present invention, there is provided a signal transmission circuit having a signal receiving circuit to which an input signal is transmitted through a transmission line comprising: a) a first power supply source having a first power source voltage; b) a second power supply source having a second power source voltage; c) a third power supply source having a third power source voltage; the second power source voltage being lower than the first power source voltage and higher than the third power source voltage; and d) a signal transmitting circuit having a control circuit connected to the first power supply source for outputting an inverted or a non-inverted input voltage in accordance with the first power source voltage and first and second pairs of push-pull type drivers for feeding an inverted or a non-inverted output signal from the control; the first and the second push-pull type drivers being connected to the second power supply source so as to transmit a pair of complementary transmission signals output from the control circuit to the transmission line with a value in accordance with the second power source voltage.

According to further aspect of the present invention, there is provided a signal transmission device having a pair of transmission lines terminated with a terminal resistor and a plurality of signal transmitting and receiving circuits connected to the pair of transmission lines whereby information is communicated between the signal transmitting and receiving circuits, the device comprising: a) a first power supply source having a first power source voltage; b) a second power supply source having a second power source voltage; c) a third power supply source having a third power source voltage; the second power source voltage being lower than the first power source voltage and higher than the third power source voltage; and d) a signal transmitting circuit having a control circuit connected to the first power supply source for outputting an inverted or a non-inverted input voltage in accordance with the first power source voltage and first and second pairs of push-pull type drivers for feeding an inverted or a non-inverted output signal from the control; the first and the second push-pull type drivers being connected to the second power supply source so as to transmit a pair of complementary transmission signals output from the control circuit to the transmission line with a value in accordance with the second power source voltage.

3

Figure 3:
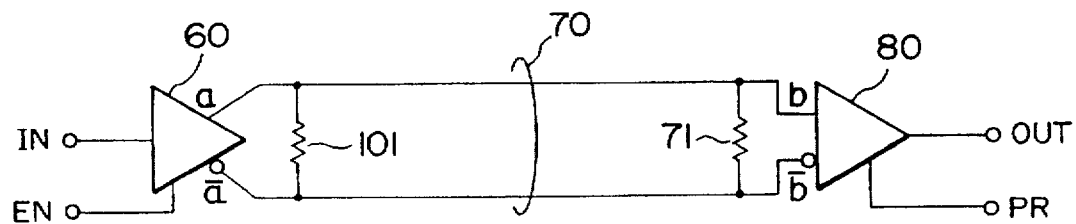
Figure 4:
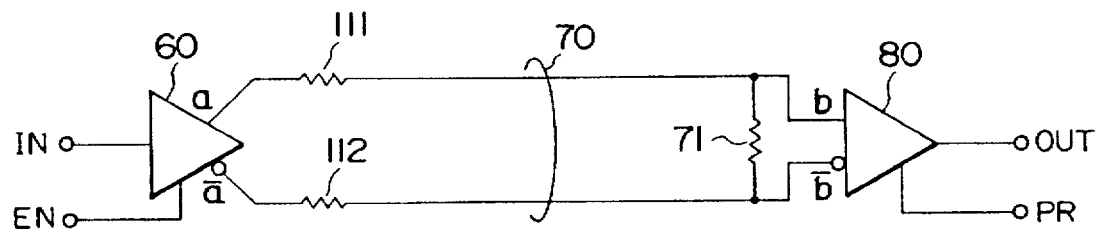
Figure 5:
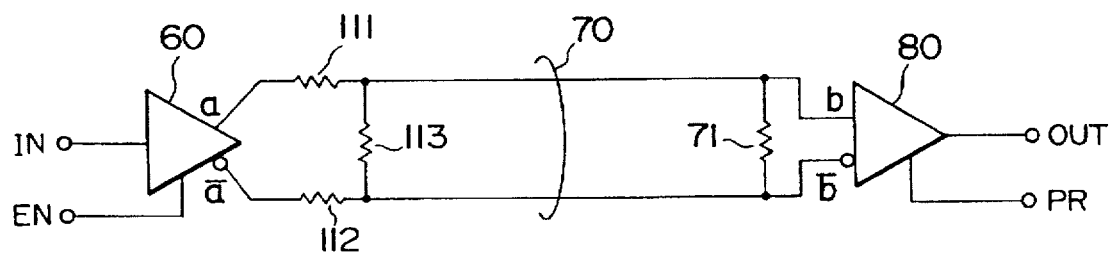
Figure 6:
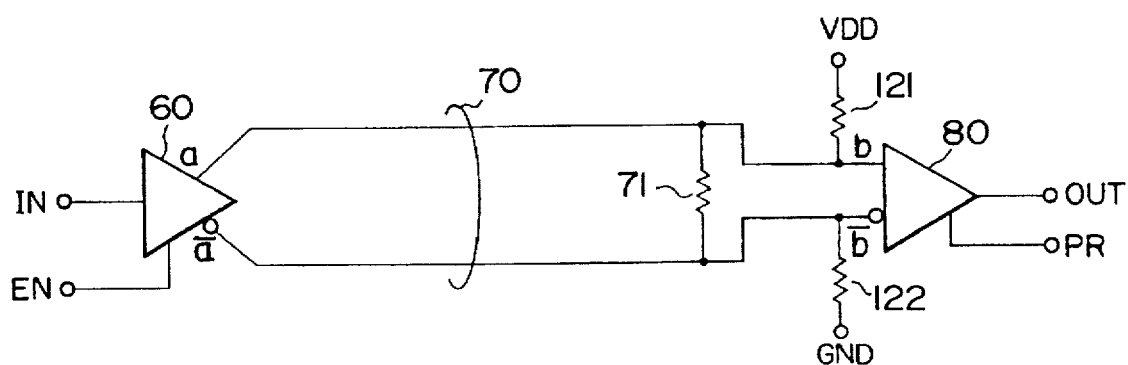
Figure 7:
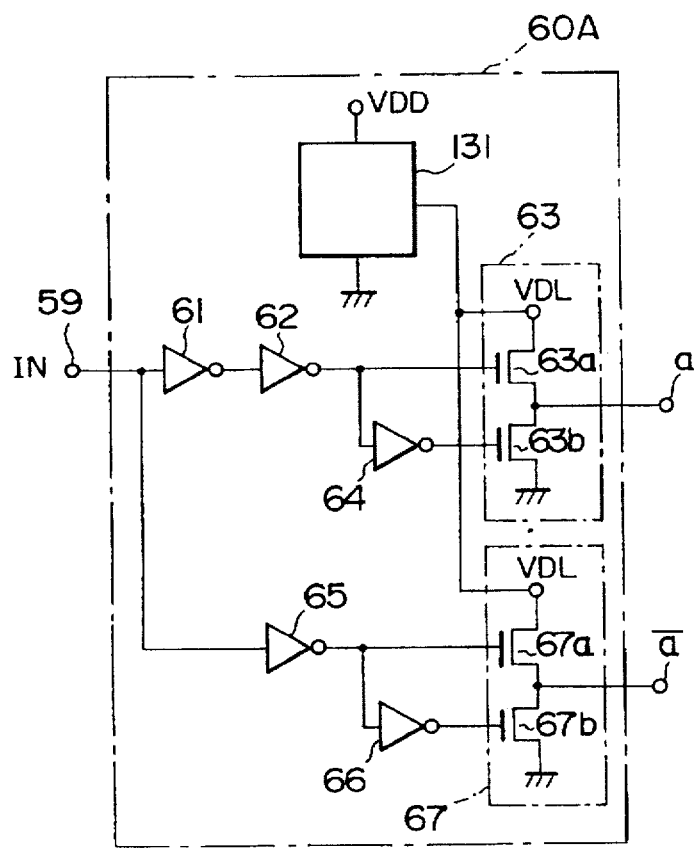
Figure 8:
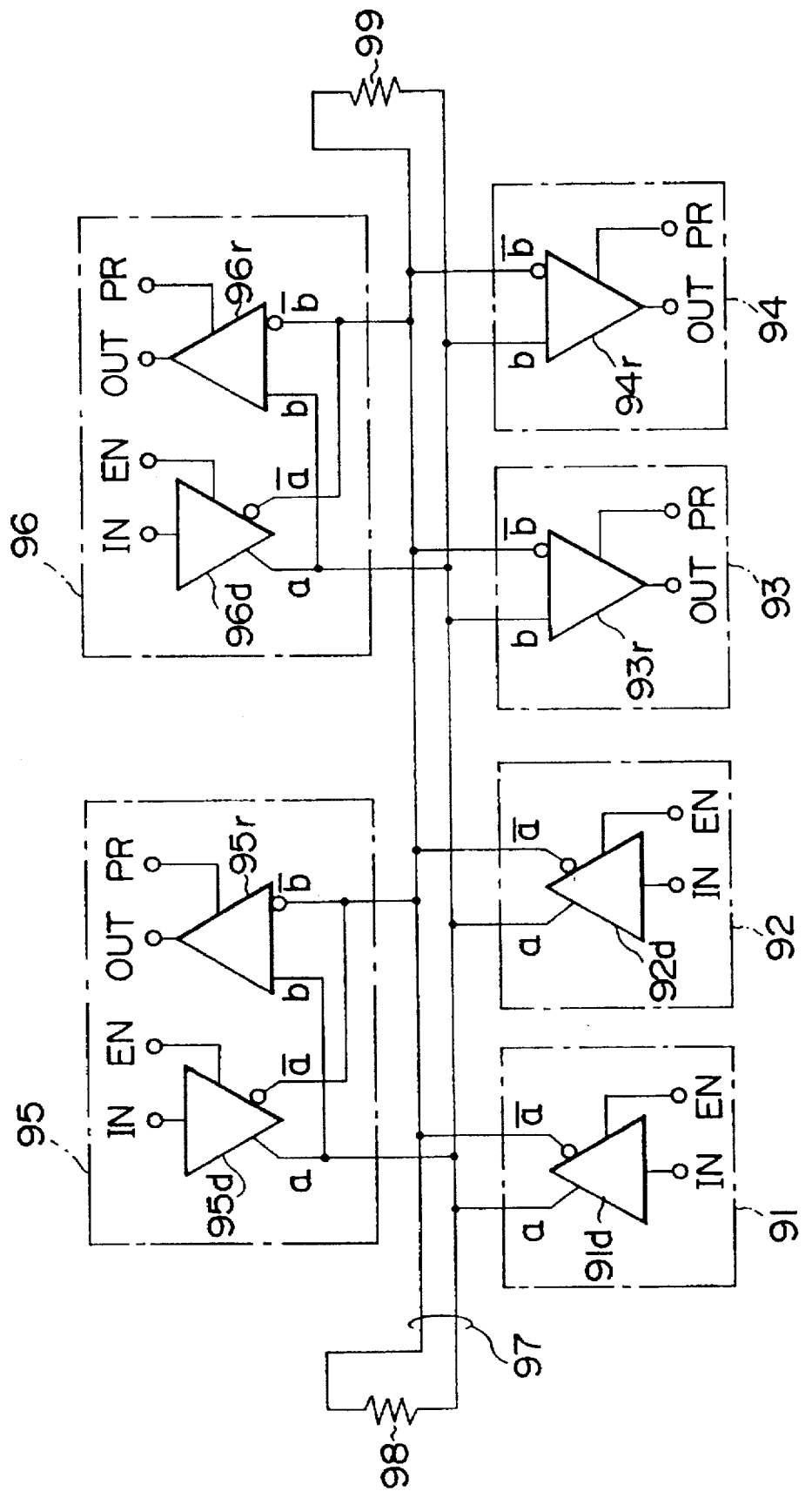
Figure 9:
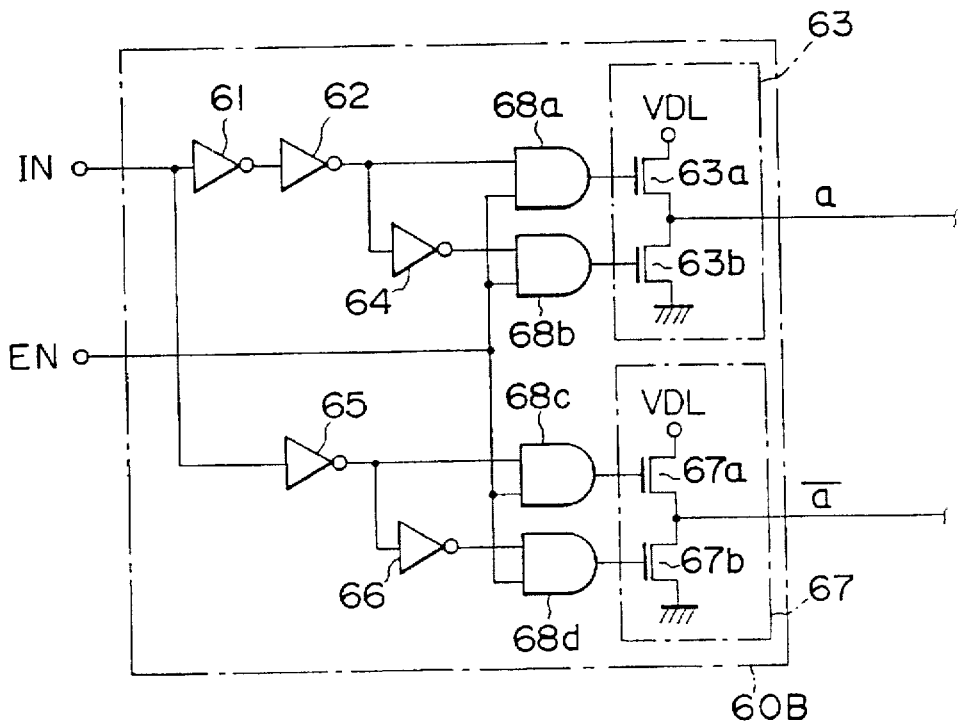
Figure 10:
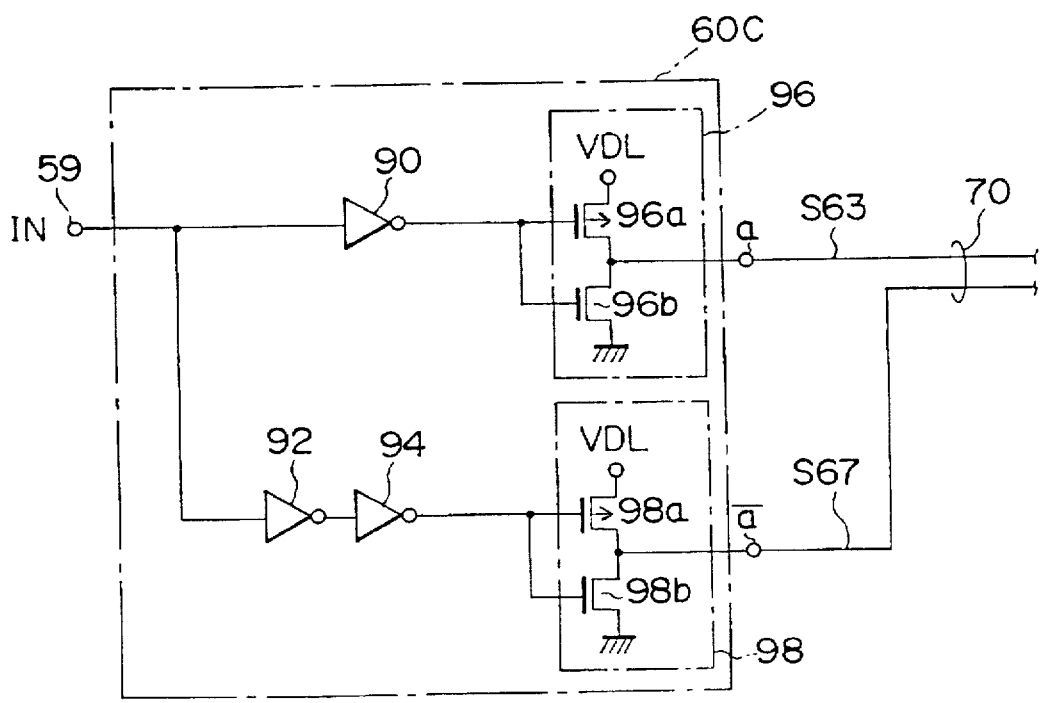

FIG. 3 is a circuit diagram illustrating a signal transmission circuit according to the second embodiment of the present invention;

FIG. 4 is a circuit diagram illustrating a signal transmission circuit according to the third embodiment of the present invention;

FIG. 5 is a circuit diagram illustrating a signal transmission circuit according to the fourth embodiment of the present invention;

FIG. 6 is a circuit diagram illustrating a signal transmission circuit according to the fifth embodiment of the present invention;

FIG. 7 is another circuit diagram illustrating a signal transmitting circuit applicable to the signal transmission circuit according to each of the first to fifth embodiments of the present invention;

FIG. 8 is a structural view illustrating a signal transmission device according to the present invention;

FIG. 9 is a circuit diagram illustrating a signal transmission circuit in the signal transmission device shown in FIG. 8; and FIG. 10 is a circuit diagram illustrating a signal transmitting circuit employing push-pull type drivers constituted of CMOS transistors.

DETAILED DESCRIPTION OF THE PREFERRED EMBODIMENTS

A detailed description will be made as to a signal transmission circuit and a signal transmission device according to the present invention with reference to the attached drawings.

Figure 1:
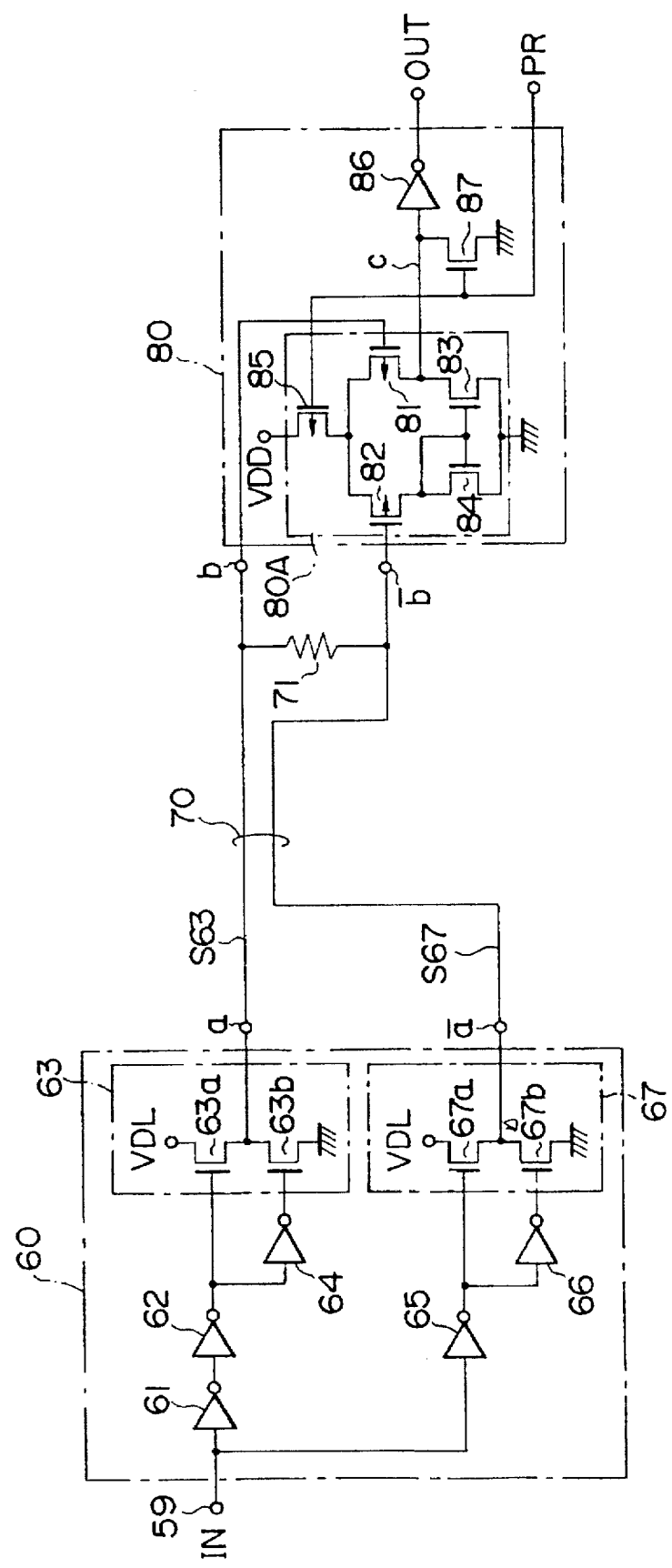
FIG. 1 is a circuit diagram illustrating a signal transmission circuit according to the first embodiment of the present invention.

FIG. 1 is a circuit diagram illustrating a signal transmission circuit according to the first embodiment of the present invention. The signal transmission circuit is constructed such that a signal transmitting circuit 60 and a signal receiving circuit 80 are respectively formed in different semiconductor integrated devices and complementary output terminals a and ā of the signal transmitting circuit 60 are respectively connected, through transmission lines 70, with complementary input terminals b and b̄ of the signal receiving circuit 80. The transmission lines 70, which are illustrated in a simplified form in FIG. 1, are constituted of microstrip lines or twisted-pair lines, both usually formed on a printed circuit board (PCB).

The signal transmitting circuit 60 outputs a pair of complementary transmitting signals S63 and S67 from the complementary output terminals a and ā when a transmitting signal is input to an input terminal 59 from an internal circuit (not shown) in the semiconductor integrated circuit device in which the signal transmitting circuit 60 is formed. The signal transmitting circuit 60 incorporates therein a control circuit constituted of CMOS inverters 61, 62, 64, 65 and 66 to which the first power source, i.e., 5 volt power source voltage VDD, for the internal circuit is applied and push-pull type drivers 63 and 67 constituted of NMOS transistors 63a, 63b, 67a and 67b.

The input terminal 59 is connected to the input of the CMOS inverter 61, whereas the output of the CMOS inverter 61 is connected to the input of the CMOS inverter 62. The output of the CMOS inverter 62 is connected to the gate of the NMOS transistor 63a in the push-pull type driver 63. The output of the CMOS inverter 62 is connected, through the CMOS inverter 64, to the gate of the NMOS transistor 63b in the push-pull type driver 63.

The drain of the NMOS transistor 63a is connected to the second power source, i.e., 1.2 volt power source voltage

4

VDL. The source of the NMOS transistor 63a is connected to the drain of the NMOS transistor 63b and also connected to the non-inverted output terminal a as well. The source of the NMOS transistor 63b is connected to ground.

On the other hand, the input terminal 59 is connected to the input of the CMOS inverter 65, whereas the output of the CMOS inverter 65 is connected to the gate of the NMOS transistor 67a in the push-pull type driver 67. The output of the CMOS inverter 65 is connected, through the CMOS inverter 66, to the gate of the NMOS transistor 67b. The drain of the NMOS transistor 67a is connected to the second power source VDL. The source of the NMOS transistor 67a is connected to the drain of the NMOS transistor 67b and also connected to the inverted output terminal ā as well. The source of the NMOS transistor 67b is connected to ground.

A transmitting signal fed to the input terminal is inverted to a signal having a voltage level between GND and VDD by the CMOS inverters 61, 62, 64, 65 and 66 to which the 5 V power source voltage VDD is supplied. It has to be noted that each output impedance in a triode region where the NMOS transistors 63a, 63b, 67a and 67b turn to be in an ON-state when 5 V is applied to their gates, is respectively set to be approximately 100 Ω, which can be realized with recently developed CMOS manufacturing technologies.

A pair of transmission lines 70, which is constituted of, for example, a twisted pair of lines or the like, is connected to the complementary output terminals a and ā. The opposite ends of the respective transmission lines 70 are connected to the complementary input terminals b and b̄, respectively. The pair of transmission lines 70, which are terminated with a terminal resistor 71 having the value of its characteristic impedance, transmit a pair of the transmitting signals to the signal receiving circuit 80. In this embodiment, the characteristic impedance is set to be 100 Ω. Therefore, the value of the terminal resistor 71 is also set to be 100 Ω.

The complementary input terminals b and b̄ are respectively connected to the inputs of a current mirror-type amplifier 80A. The signal receiving circuit 80, into which the current mirror-type amplifier 80A is incorporated, is designed such that the input impedance is set to be larger than that of the terminal resistor 71.

The current mirror-type amplifier 80A employs, at the input circuit, PMOS transistors 81 and 82, the sources of which are mutually connected, and the complementary input terminals b and b̄ are respectively connected to the gates of the PMOS transistors 81 and 82. The current mirror-type amplifier 80A also employs a current mirror circuit constituted of NMOS transistors 83 and 84.

The current mirror circuit is constructed such that the gate and the drain of the NMOS transistor 84 are connected with each other and the drains of the PMOS transistors 81 and 82 are respectively connected to the drains of the NMOS transistors 83 and 84. Further, each of the sources of the NMOS transistors 83 and 84 is commonly connected to ground. The sources of the PMOS transistors 81 and 82 are commonly connected to the drain of the PMOS transistor 85, and the source of the PMOS transistor 85 is connected to the power source voltage VDD.

The current mirror-type amplifier 80A can be operated at a speed over 150 MHz in response to the complementary input signal having less than 200 mV in amplitude if adequately designed by employing recently developed fine lithographic CMOS manufacturing techniques. The drain of the PMOS transistor 81 is connected, through an inverter 86, to an output terminal OUT. The input of the inverter 86 is connected to drain of an NMOS transistor 87 and the source of the NMOS transistor 87 is connected to the ground. Each of the gates of the NMOS transistors 85 and 87 is commonly connected to a control input terminal PR.

Figure 2:
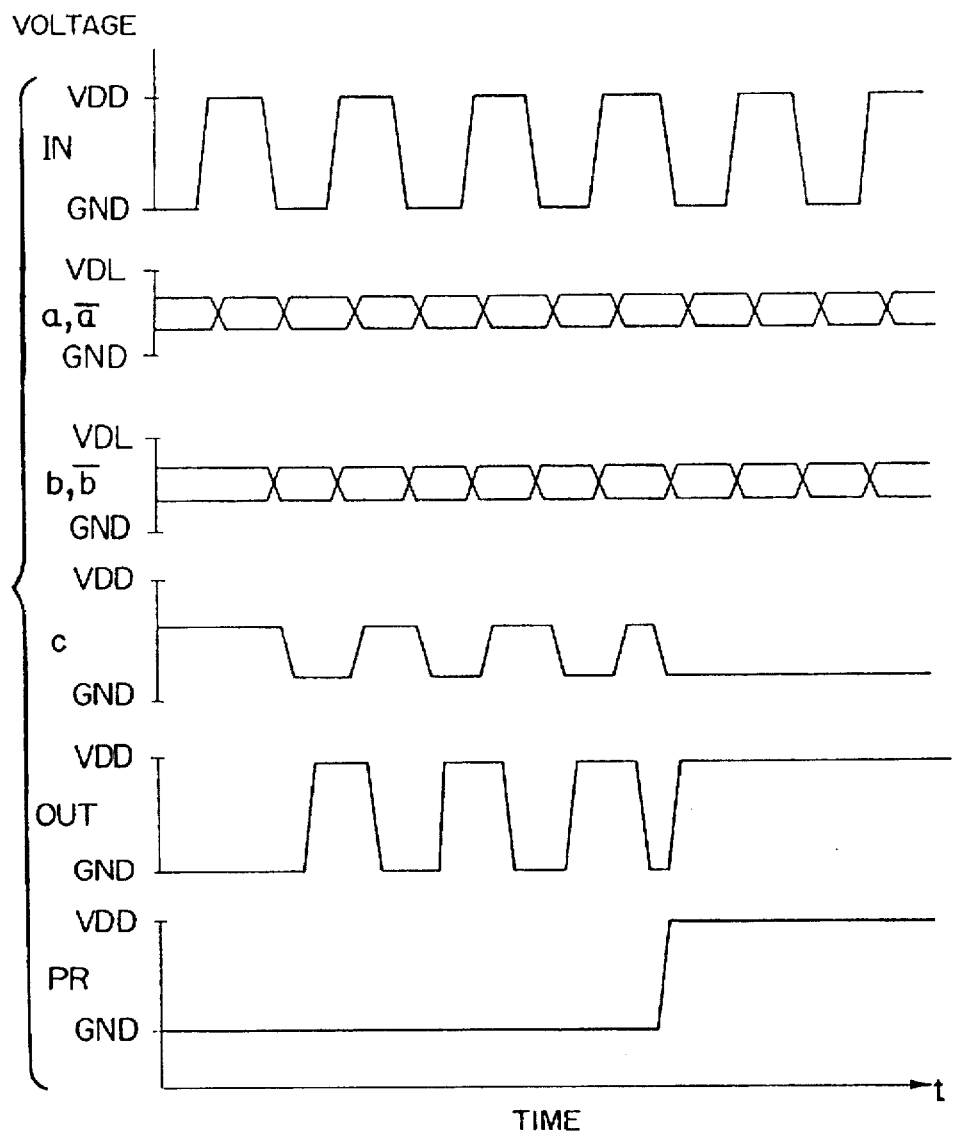
FIG. 2 is a time chart illustrating operational waveforms of the embodiment shown in FIG. 1.

FIG. 2 is a time chart illustrating various operational waveforms viewed in the circuit shown in FIG. 1, wherein a horizontal axis represents time and a vertical axis represents voltage, respectively. Hereinafter, the operation of the circuit shown in FIG. 1 is described in details with reference to FIG. 2.

When the input signal IN fed to the input terminal 59 is high "H", the NMOS transistor 63a turns to be in an ON-state because the input signal IN is inverted to be low "L" by the inverter 61 and further inverted to be "H" by the inverter 62. Since the output signal of the inverter 62 is turned to be "L" by the inverter 64, which causes the NMOS transistor 63b to be in an OFF-state, the output signal of the non-inverted output terminal a turns to be "H".

On the other hand, when the input signal IN is "L", the NMOS transistor 63a turns to be in an OFF-state because the input signal IN is inverted to be "H" by the inverter 61 and further inverted to be "L" by the inverter 62.

Since the output signal of the inverter 62 is turned to be "H" by the inverter 64, which causes the NMOS transistor 63b to be in an ON-state, the output signal of the non-inverted output terminal a turns to be "L".

Similarly, when the input signal IN fed to the input terminal 59 is "H", the NMOS transistor 67a turns to be in an OFF-state because the input signal IN is inverted to be "L" by the inverter 65. Further, since the output signal of the inverter 65 is turned to be "H" by the inverter 66, which causes the NMOS transistor 67b to be in an ON-state, the output signal of the non-inverted output terminal $\bar{a}$ turns to be "L".

On the other hand, when the input signal IN is "L", the NMOS transistor 67a turns to be in an ON-state because the input signal IN is turned to be "H" by the inverter 65. Since the output signal of the inverter 65 is turned to be "L" by the inverter 66, which causes the NMOS transistor 67b to be in an OFF-state, the output signal of the inverted output terminal $\bar{a}$ turns to be "H".

The complementary output signals S63 and S67 output from the complementary output terminals a and $\bar{a}$ are transferred through the transmission lines 70 and fed to the complementary input terminals b and $\bar{b}$ of the signal receiving circuit 80 with a transmission delay time which depends on the length of the transmission lines.

Since the impedance matching is accomplished by terminating the receiving terminals of the transmission lines 70 with the terminal resistor 71, the amplitude and the waveforms of the signals appearing at the complementary input terminals b and $\bar{b}$ can be accurately transferred, without being deformed, to the complementary input terminals b and $\bar{b}$.

The amplitude $V_{swing}$ of the complementary output signals S63 and S67 can be expressed with the following equation (1):

$$V_{swing}=VDL\times RL/(RL+2\times RON) \qquad (1)$$

wherein the output impedance of the NMOS transistors 63a, 63b, 67a and 67b is RON, the resistance of the terminal resistors 71 is RL, and the power source voltage for the signal transmitting circuit is VDL.

Since the first embodiment sets conditions as RON=100 Ω, RL=100 Ω and VDL=1.2 V, the amplitude $V_{swing}$ is calculated as follows:

$$V_{swing}=1.2V\times 100/(100+2\times 100)=0.4V$$

Accordingly, the levels of "H" and "L" are, respectively, 800 mV and 400 mV.

When the complementary output signals S63 and S67 are fed to the gates of the PMOS transistors 81 and 82 in the signal receiving circuit 80 under conditions that the control input signal PR fed to the control input terminal PR is "L", the output signal OUT having a CMOS level (VDD level) is output, as a result of differential amplification, from the drain of the PMOS transistor 81, through the inverter 86, to the output terminal OUT. The current mirror circuit constituted of the NMOS transistors 83 and 84 supplies the identical current to the PMOS transistors 81 and 82.

If the control input signal PR fed to the control input terminal PR is converted from "L" to "H", the PMOS transistor 85 turns to be in an OFF-state, whereby no current flows. The NMOS transistor 87 turns to be in an ON-state, which causes the input of the inverter 86 to be "L", so that the output signal OUT becomes "H". The NMOS transistor 87 turns to be in an ON-state, which causes the input of the inverter 86 to be "L", so that no rush current flows.

As described above, since the signal transferred through the transmission lines 70 can be decreased in amplitude by approximately 400 mV with the present embodiment, high speed charge and discharge to a parasitic load capacitance can be realized even in transmission lines having a large parasitic load capacitance, thereby accomplishing high speed signal transmission. The signal transmission is made with the terminal resistor 71 being disposed in the transmission lines 70 to match the characteristic impedance, so that generation of noise caused by reflection due to the impedance mismatch can be suppressed. Coupling noise, such as cross-talk or an like, super-imposed on the transmission lines 70, will become a common mode so that it scarcely affects the operation of amplification of the differential input-type signal receiving circuit 80. Further, the signal transmitting circuit 60 provides the power supply voltage VDL for the transmitting circuit, which is relatively smaller in voltage amplitude than the power supply voltage VDD for the internal circuit, with the output stage, i.e., the push-pull type drivers 63 and 67, so that a remarkable reduction of the power consumption can be realized as compared with the conventional technology. Assuming that the power supply voltage VDD is, for example, 5 V, the power consumption caused by the current flowing through the transmission lines 70 will be 25 mW per one circuit. When the power source voltage VDL is set to be 1.2 V, the power consumption PD caused by the current flowing through the transmission lines 70, is defined as follows:

$$PD=VDL\times VDL/(RL+2\times RON) \qquad (2)$$

According to the values of each element in the first embodiment, the power consumption PD caused by the current flowing through the transmission lines 70 will be 4.8 mW, so that the power consumption can be reduced by approximately 80% while maintaining a transmission characteristic similar to that of the conventional technology.

Resistors respectively inserted in series in the transmission lines 70, which are necessitated under the conventional signal transmission circuit, can be eliminated by adequately setting the output impedance RON of the NMOS transistors 63a, 63b, 67a and 67b in the signal transmitting circuit, and a similar signal transmission with a small amplitude can be realized, which may remarkably improve the efficiency of packaging the parts on the PCB.

To implement the first embodiment, the power supply voltage VDL for applying a low voltage, for example 1.2 V, to the signal transmitting circuit, needs to be supplemented in addition to the 5 V power supply voltage VDD. The power source which generates 1.2 V in voltage can maintain the conversion efficiency of more than 60% as compared to that of the power source which generates, for example, 5 V in voltage, so that the PCB or the device on which the signal transmitting circuit according to the present embodiment is mounted, can readily reduce the total power consumption.

Although the power source voltage VDL is set to be 1.2 V as a preferable example in the first embodiment, the present invention is not restricted to the value of 1.2 V. In other words, the power source voltage VDL may be chosen less than half of the power source voltage VDD and higher than the sum of the threshold voltages of the transistors 63a and 63b (or transistors 67a and 67b) although it depends on the current driving capacity of the push-pull type driver 63 (or 67) constituted of CMOS transistors or the terminal resistor 71.

FIG. 3 is a schematic circuit diagram illustrating a signal transmission circuit according to the second embodiment of the present invention.

In the drawing, each structural element of the signal transmitting circuit 60, the transmission lines 70, the terminal resistor 71 and the signal receiving circuit 80 is identical to each corresponding element of the first embodiment shown in FIG. 1 bearing identical references. The signal transmission circuit shown in FIG. 3 can be achieved by providing a resistor 101 at the complementary output terminals a and $\bar{a}$ of the signal transmitting circuit shown in FIG. 1.

Although the fundamental operation of the circuit shown in FIG. 3 is quite similar to that shown in FIG. 1, transmission characteristic has been improved as compared to the circuit shown in FIG. 1.

The circuit shown in FIG. 1 is constructed such that the transmission lines 70 are terminated at the receiving terminals with the terminal resistor 71, which has the same impedance as that of the lines. Accordingly, theoretically, no reflection signals caused by the transmission signal from the signal transmitting circuit 60 to the signal receiving circuit 80 can be generated. The signal receiving circuit 80 has, however, a parasitic input capacitance which causes impedance mismatch, so that a reflection signal (the primary reflection signal) is actually generated and transferred from the signal receiving circuit 80 to the signal transmitting circuit 60.

The primary reflection signal will disappear if the output impedance Zo of the transmitting circuit 60, as viewed from the transmission lines 70, would match the characteristic impedance of the transmission lines 70. However, since the output impedance Zo of the transmitting circuit 60 is defined as Zo=200 Ω (=2×RON (RON=100 Ω)), the secondary reflection signal caused by the primary reflection signal is generated, which causes distortion on the transmission signal in the transmission lines 70, thereby hampering realization of higher transmission speed of the present circuit.

Since the second embodiment shown in FIG. 3 provides the resistor 101 having the resistance, for example (RS=) 200 Ω, the output impedance Zo made of the resistor 101 and the transmitting circuit 60 viewed from the transmission lines 70, can be calculated as Zo=1/((1/RS)+(1/(2×RON))) to achieve Zo=100 Ω.

As described above, since the second embodiment shown in FIG. 3 can well suppress generation of the above mentioned secondary reflection signal, a signal transmission device can be realized which accomplishes higher transmission speed. The resistor 101 can be installed, as an external part, on the PCB and also formed in the semiconductor integrated circuit in which the signal transmitting circuit 60 is embedded.

FIG. 4 is a schematic circuit diagram illustrating a signal transmission circuit according to the third embodiment of the present invention.

In the drawing, each structural element of the signal transmitting circuit 60, the transmission lines 70, the terminal resistor 71 and the signal receiving circuit 80 is identical to each corresponding element of the first embodiment shown in FIG. 1 bearing identical references. The signal transmission circuit shown in FIG. 4 can be achieved by supplementing resistors 111 and 112 in series relative to the transmission lines 70 between each complementary output terminals a and $\bar{a}$ and the transmission lines 70.

According to FIG. 4, the output impedance can be 100 Ω if the output impedance Zo of the signal transmitting circuit 60 viewed from the transmission lines 70 in FIG. 1 is less than 100 Ω, so that the secondary reflection signal can be well suppressed. The principle is the same as that in FIG. 3.

FIG. 5 is a schematic circuit diagram further illustrating a signal transmission circuit according to the fourth embodiment of the present invention, wherein each structural element of the signal transmitting circuit 60, the transmission lines 70, the terminal resistor 71, the signal receiving circuit 80 and the resistors 111 and 112 is identical to each corresponding element of the third embodiment shown in FIG. 4 bearing identical references. The signal transmission circuit shown in FIG. 5 can be achieved by supplementing a resistor 113 between respective ends of the resistors 111 and 112, both of the other ends of which are respectively connected to the complementary output terminals a and $\bar{a}$ of the signal transmitting circuit 60.

According to the signal transmission circuit shown in FIG. 5, the output impedance Zo constituted of the signal transmitting circuit 60 viewed from the transmission lines 70 and the resistors 111, 112 and 113, can be matched with the characteristic impedance of the transmission lines 70 and the signal can also be set with flexibilities in amplitude, by setting the resistance values of the resistors 111, 112 and 113. Similar to the description as to FIG. 1, when the output impedance only of the transmitting circuit 60 is RON, the resistance values of the terminal resistor 71, and the resistors 111, 112 and 113, are respectively RL, RS, RS and RP, the output impedance Zo constituted of the signal transmitting circuit 60 viewed from the transmission lines 70 and the resistors 111, 112 and 113, can be defined by the following equation (3):

$$1/Zo=1/(2\times RON+2\times RS)+1/RP \tag{3}$$

The output signal amplitude $V_{swing}$ is also defined by the equation (4).

$$V_{swing}=VDL\times RG/(RG+2\times RON+2\times RS) \tag{4}$$

wherein 1/RG=1/RL+1/RP and VDL is a voltage of the second power source.

Accordingly, as long as the output impedance Zo defined according to equation (3) is equal to the characteristic impedance of the transmission lines 70, the resistance values RS and RP can be voluntarily set so that the output signal amplitude $V_{swing}$ can be freely adjusted.

According to the second to fourth embodiments shown in FIGS. 3 to 5, either a resistor is connected between the complementary output terminals of the signal transmitting circuit or a resistor is inserted in series between the complementary output terminals and the transmission lines in order to match the output impedance of the transmitting circuit with the characteristic impedance of the transmission lines, so that generation of the second reflection signal can be well suppressed and high speed signal transmission can be realized.

FIG. 6 is a schematic circuit diagram illustrating a signal transmission circuit according to the fifth embodiment of the present invention, in which each constructional element of the signal transmitting circuit 60, the transmission lines 70, the terminal resistor 71 and the signal receiving circuit 80 is identical to that shown in FIG. 1, bearing the identical references.

The signal transmission circuit shown in FIG. 6 is constructed such that in the circuit shown in FIG. 1, a resistor 121 is provided to connect one of the complementary input terminals b and b̄ of the signal receiving circuit 80 with the power source VDD, and a resistor 122 is provided to connect the other input terminal with the ground GND. The resistance of the resistors 121 and 122 is much larger than that of the terminal resistor 71.

In a recent communication system, a printed circuit board contained in a device happens to be inserted into or from the device while the power source continues to be turned on, a so called as "hot replacement". If the printed circuit board on which the signal transmitting circuit 60 is mounted is pulled out while the power source of the printed board on which the signal receiving circuit 80 is mounted continues to be turned on, input voltages appearing on the input terminals b̄ and b of the signal receiving circuit 80 reveal the same voltage level and become unstable, so that an output voltage of the output c of the current mirror-type amplifier 80A becomes unstable, which causes an increase of the rush current in circuits successive to the next stage and oscillation, at worst, of the current mirror type amplifier 80. This is because the current mirror-type amplifier features an uncertain operational region in which the output logic is not fixed as "0" or "1" in the vicinity of the operational region in which the complementary input voltages reveal the same voltage level.

Since the resistors 121 and 122 are provided in the circuit shown in FIG. 6, a slightly weak current is provided through the resistor 121, the terminal resistor 71 and the resistor 122 even when the printed circuit board on which the signal transmitting circuit 60 is mounted is removed as described above, a potential difference determined by the divisional ratio of the respective resistors is generated on the complementary input terminals b and b̄ of the signal receiving circuit 80. By setting the potential difference in such a manner as not to fall in the uncertain operational region, an output uncertainty condition of the current mirror-type amplifier under the hot replacement can be avoided, so that possibilities of and oscillation and an increase of such current can be eliminated.

The above described effect can be achieved such that the resistors 121 and 122 are chosen to have their resistance values, for example, 50 to 100 times larger than that of the terminal resistor 71. Accordingly, influence on a normal transmission operation is extremely small and negligible.

The resistors 121 and 122 can be realized as diffusion resistors, polycrystalline resistors or MOS transistors formed in or on the semiconductor integrated circuit in or on which the signal receiving circuit 80 is mounted.

According to the fifth embodiment in which resistors are provided to connect one of the complementary input terminals of the receiving circuit with the power source, and to connect the other terminal with ground, possibilities of an increase of the rush current occurring in the successive stage circuits and the oscillation of the current mirror type amplifier, can be eliminated even when the complementary input voltages of the signal receiving circuit become unstable.

FIG. 7 is another circuit diagram illustrating a signal transmitting circuit of a signal transmission circuit applicable to the first to fourth embodiments of the present invention.

The circuit shown in FIG. 7 corresponds to the signal transmitting circuit 60 shown in FIG. 1, in which identical elements bear the identical references. In the circuit shown in FIG. 7, a voltage drop circuit 131, which has a function to produce the second power source voltage VDL in accordance with the power source voltage VDD, is constructed so as to supply the second power source voltage VDL to push-pull type drivers 63 and 67 which drive the complementary output terminals a and ā.

If the signal transmitting circuit shown in FIG. 7 is utilized in place of the signal transmitting circuit shown in FIG. 1, there is no need to provide externally the second power source voltage VDL having, for example, 1.2 V, to the semiconductor integrated circuit on which the signal transmitting circuit is mounted, and there can be realized a device according to the present invention only by employing the first power source voltage VDD. The voltage drop circuit 131 can be constructed by utilizing, for example, the principle of a series control-type stabilized power source circuit shown in FIG. 8.37 at page 98 in "Analog Integrated Circuit Designing Technology for VLSI" published by Baifukan and authored by P. R. Grey and R. G. Meyer, employing well known CMOS operational amplifiers, in or on the semiconductor integrated circuit. Other modifications are, of course, possible.

Even though there is a demerit, if the circuit shown in FIG. 7 is employed, that a total power consumption will become larger since the power is consumed with a drop in voltage in the voltage drop circuit 131, there is no need to provide externally the second power source voltage VDL, so that there is no need to prepare two types of power sources. This type of circuit is particularly advantageous when a number of circuits in the transmitting circuit formed in the semiconductor integrated circuit is low.

According to the transmitting circuit 60A shown in FIG. 7, since the second power source voltage VDL is produced from the first power source voltage by employing the voltage drop circuit in the transmitting circuit, the second power source voltage VDL cannot be externally supplied. Accordingly, the present invention can be utilized under the condition of a unitary power source voltage.

FIG. 8 is a schematic circuit diagram illustrating a signal transmission device utilizing the signal transmission circuit shown in FIG. 1. The signal transmission device is constituted of a plurality of signal transmitting circuits and signal receiving circuits both connected to a pair of transmission lines 97 through bus lines. Although the signal transmission device shown in FIG. 8 is constituted of the signal transmission circuit shown in FIG. 1, the device can be, of course, constituted of the circuits shown in FIGS. 3 to 6.

The signal transmission device is constituted of semiconductor integrated circuits 91 and 92 in which signal transmitting circuits 91d and 92d are incorporated and semiconductor integrated circuits 93 and 94 in which signal receiving circuits 93r and 94r are incorporated. Semiconductor integrated circuits 95 and 96 incorporate therein not only signal transmitting circuits 95d and 96d, but also signal receiving circuits 95r and 96r. The signal receiving circuits 93r, 94r, 95r and 96r have an identical circuit diagram to that of the first embodiment shown in FIG. 1.

These signal transmitting circuits 91d, 92d, 95d and 96d and signal receiving circuits 93r, 94r, 95r and 96r are mutually connected with each other, through the transmission lines 97, with each other. The both ends of the transmission lines 97 are terminated with terminal resistors 98 and 99 for impedance matching.

FIG. 9 is a schematic circuit diagram illustrating the signal transmitting circuits 91d, 92d, 95d and 96d shown in FIG. 8, wherein identical elements corresponding to those of the first embodiment shown in FIG. 1 are shown with the identical reference. The signal transmitting circuits 91d, 92d, 95d and 96d are constructed such that each gate of the NMOS transistors 63a, 63b, 67a and 67b constituting push-pull type drivers 63 and 67, is respectively connected to the outputs of the CMOS AND gates 68a, 68b, 68c and 68d.

In other words, the output of the inverter 62 is connected to one of the inputs of the AND gate 68a, the output of which is connected to the gate of the NMOS transistor 63a. The output of the inverter 64 is connected to one of the inputs of the AND gate 68b, the output of which is connected to the gate of the NMOS transistor 63b.

Similarly, the output of the inverter 65 is connected to one of the inputs of the AND gate 68c, the output of which is connected to the gate of the NMOS transistor 67a. The output of the inverter 66 is connected to one of the inputs of the AND gate 68d, the output of which is connected to the gate of the NMOS transistor 67b. On the other hand, an output enable control input terminal EN is commonly connected to each of the other inputs of the AND gates 68a, 68b, 68c and 68d. Other circuit connections are identical to those of FIG. 1.

Circuit operations will be further described with reference to FIGS. 8 and 9.

Each semiconductor integrated circuits 91–96 receives, as the power source voltage for internal circuits, the power source voltage VDD having, for example, 5 V, whereas each semiconductor integrated circuits 91, 92, 95 and 96 receives, as the power source voltage for signal transmitting circuits, the power source voltage VDL having, for example, a value of 1.2 V. The power source voltage VDL is applied to circuits which correspond to the push-pull type drivers 63 and 67 shown in FIG. 1 in the signal transmitting circuits 91d, 92d, 95d and 96d.

The signal transmission is made through the transmission lines 97 with approximately 400 mV in signal amplitude in the signal transmission device shown in FIG. 8 when the power source voltage VDL for the transmitting circuits is set to be 1.2 V, provided that the output impedance of the NMOS transistors which constitutes push-pull type drivers in the signal transmitting circuits 91d, 92d, 95d and 96d, is set to be a half value in resistance of the terminal resistors 98 and 99. In FIG. 8, one of the signal transmitting circuit 91d, 92d, 95d and 96d is selectively output-enabled in response to each output enable control input signals EN, the transmission lines 97 are driven and a signal with a small amplitude is transferred to the signal receiving circuits 93r, 94r, 95r and 96r.

As described above, the power consumption is remarkably reduced in the PCB incorporating a plurality of signal transmission circuits thereinto according to the second embodiment, so that restrictions in designing for the PCB, such as those of adequate parts arrangement caused by heat generation, can be remarkably relaxed. Although it is necessary to provide the power source voltage VDL for supplying a low voltage, such as 1.2 V, to the signal transmitting circuits, in addition to the power source voltage VDD having 5 V in order to activate the present embodiment, the total power consumption can be reduced in the PCBs or the integrated devices on which a plurality of signal transmission circuits according to the present embodiment are incorporated, because the power source which generates the 1.2 V voltage maintains high conversion efficiency having more than 60% relative to that of the power source which generates, for example, the 5 V voltage.

Further, bidirectional signal transmission can be realized through the transmission lines 97 between a plurality of semiconductor integrated circuits.

Although description has been made as to exemplary embodiments, the present invention can not be limited to the aforementioned embodiments and various modifications can be realized.

Such modifications are, for example, as follows:

(1) The control circuit, which is applicable to the first to fourth embodiments, for driving the push-pull type drivers 63 and 64 constituted of CMOS inverters 61, 62, 64, 65 and 65 shown in FIG. 1, can be modified based on the other circuit diagrams. In be concrete, the push-pull type drivers 63 and 64 can be constituted of MOS structures including PMOS transistors. The NMOS transistors 63a and 67a in FIG. 1 may be, for example, replaced by PMOS transistors to constitute CMOS inverter type push-pull-type drivers if the control circuit were adequately modified.

FIG. 10 is a circuit diagram illustrating an example where the push-pull type drivers are constituted of CMOS transistors. Push-pull type drivers 96 and 98 are respectively constituted of the PMOS transistor 96a and the NMOS transistor 96b and the PMOS transistor 98a and the NMOS transistor 98b. The push-pull type driver 96 outputs a non-inverted output, whereas the push-pull type driver 98 outputs an inverted output. Accordingly, the push-pull type driver 96 is connected with the control circuit constituted of the CMOS inverter 90, whereas the push-pull type driver 98 is connected with the control circuit constituted of the CMOS inverters 92 and 94. Even in this case, each PMOS transistors which constitute the push-pull type drivers reveals an equal output impedance in a triode region in an ON-state.

(2) The transmission lines 70 are not limited to the twisted pair lines and can be replaced with various alternative transmission lines such as microstrip lines on the a PCB or the like.

(3) Various circuit configurations can be applied to the signal receiving circuit 80 if they perform differential voltage amplification employing complementary input terminals with high input impedance. For example, circuits including a CMOS current mirror-type differential amplifier or current switch type differential amplifier utilizing bipolar transistors, can be applied.

As described above in details, the signal transmission circuit according to the present invention is constructed such that the output stage of the signal transmitting circuit is constituted of push-pull-type drivers in which the power source voltage for the signal transmitting circuit having lower voltage than the power source voltage for the internal circuits, is supplied, whereby the power consumption caused by the current which flows through the transmission lines can be remarkably reduced as compared to the conventional circuit. Further, since high speed signal transmission with small voltage amplitude can be realized with the output stage constituted of MOS transistors, without supplementing with any external parts except the terminal resistor for the transmission lines, the efficiency of packaging the parts on the PCB can be remarkably improved and a manufacturing cost reduction for the device can be realized as compared to the conventional circuit.

Furthermore, the signal transmission device according to the present invention can be widely applied to various electrical circuit devices such as switch devices for broad band ISDN (B-ISDN), transmission devices, computers which necessitate high speed transmission of digital signals between each respective semiconductor integrated circuits, or the like. The Gunning Transceiver Logic (GTL), which is one of the interface systems to which a standardization process has been ongoing, utilizes the terminal voltage having 1.2 V or 1.5 V and performs high speed digital signal transmission as compared to the conventional TTL or CMOS interface. Since the PCB employing the GTL or the device integrating therein the PCB, incorporates the power source which generates a voltage having 1.2 V or 1.5 V, the present invention can be applied to them without supplementing a new power source.

What is claimed is:

1. A signal transmission circuit having a signal receiving circuit to which an input signal is transmitted through at least one transmission line comprising:

a) a first power supply source having a first power source voltage;
   b) a second power supply source having a second power source voltage;
   c) a third power supply source having a third power source voltage; the second power source voltage being lower than the first power source voltage and higher than the third power source voltage; and
   d) a signal transmitting circuit having a control circuit connected to the first power supply source for outputting an inverted or a non-inverted input voltage in accordance with the first power source voltage and first and second pairs of push-pull type drivers for feeding an inverted or a non-inverted output signal from the control circuit; the first and the second push-pull type drivers being connected to the second power supply source so as to transmit a pair of complementary transmission signals output from the control circuit to the transmission line with a value in accordance with the second power source voltage.

2. A signal transmission circuit as set forth in claim 1, wherein the second power source voltage is no more than half of the first power source voltage.

3. A signal transmission circuit as set forth in claim 1, wherein the first power source voltage is set to be 5 V and the second power source voltage is set to be 1.2 V.

4. A signal transmission circuit as set forth in claim 1, wherein the transmission line is terminated with a terminal resistor having the same value of a characteristic impedance of the transmission line and the signal receiving circuit reveals an input impedance larger than the value of the terminal resistor.

5. A signal transmission circuit as set forth in claim 1, wherein there is provided a resistor connected between a pair of output terminals of the signal transmitting circuit.

6. A signal transmission circuit as set forth in claim 1, wherein the transmission line comprises a pair of transmission lines and wherein a pair of output terminals of the signal receiving circuit is respectively connected through a resistor to the pair of transmission lines.

7. A signal transmission circuit as set forth in claim 1, wherein the transmission line comprises a pair of transmission lines and further comprising a first resistor connected between a pair of output terminals of the signal transmitting circuit and a pair of second resistors respectively connecting the pair of output terminals to the pair of transmission lines.

8. A signal transmission circuit as set forth in claim 1, wherein one of a pair of input terminals of the signal receiving circuit is connected, through a first resistor, to the first power supply source and the other of the pair of input terminals is connected, through a second resistor, to the third power supply source.

9. A signal transmission circuit as set forth in claim 1, wherein the signal transmitting circuit includes a voltage drop circuit for producing the second power source voltage from the first power source voltage.

10. A signal transmission circuit as set forth in claim 1, wherein the push-pull type driver comprises a first NMOS transistor for receiving at a gate thereof the non-inverted signal transferred from the control circuit and a second NMOS transistor connected in series with the first NMOS transistor for receiving at a gate thereof the inverted signal transferred from the control circuit; one of terminals of the first NMOS transistor being connected to the second power supply source, the other terminal to both the transmission line and one of terminals of the second NMOS transistor; and the other terminal of the second NMOS transistor being connected to the third power supply source.

11. A signal transmission circuit as set forth in claim 10, wherein the respective output impedances of the first and second NMOS transistors in a triode region under an ON-state are equal to each other.

12. A signal transmission circuit as set forth in claim 1, wherein the push-pull type driver comprises a PMOS transistor for receiving at a gate thereof the inverted signal transferred from the control circuit and an NMOS transistor for receiving at a gate thereof the inverted signal transferred from the control circuit; one of terminals of the PMOS transistor being connected to the second power supply source, the other terminal to both the transmission line and one of terminals of the NMOS transistor; and the other terminal of the NMOS transistor being connected to the third power supply source.

13. A signal transmission circuit as set forth in claim 12, wherein each output impedance of the PMOS and the NMOS transistors in a triode region under an ON-state is equal with each other.

14. A signal transmission circuit as set forth in claim 12, wherein the control circuit includes a plurality of complementary CMOS inverters.

15. A signal transmission circuit as set forth in claim 1, wherein the control circuit suppresses an output in response to a control signal and the first and the second pairs of push-pull type drivers transmit a signal to the transmission line when the control signal is permitted to be output.

16. A signal transmission device having a pair of transmission lines terminated with a terminal resistor and a plurality of signal transmitting and receiving circuits connected to the pair of transmission lines whereby information is communicated between the signal transmitting and receiving circuits, the device comprising:

a) a first power supply source having a first power source voltage;
   b) a second power supply source having a second power source voltage;
   c) a third power supply source having a third power source voltage; the second power source voltage being lower than the first power source voltage and higher than the third power source voltage; and
   d) a signal transmitting circuit having a control circuit connected to the first power supply source for outputting an inverted or a non-inverted input voltage in accordance with the first power source voltage and first and second pairs of push-pull type drivers for feeding an inverted or a non-inverted output signal from the control circuit; the first and the second push-pull type drivers being connected to the second power supply source so as to transmit a pair of complementary transmission signals output from the control circuit to the transmission line with a value in accordance with the second power source voltage.

17. A signal transmission device as set forth in claim 16, wherein the signal transmitting circuits receive an output permission control signal and at least one of the signal transmitting circuits permitted by the control signal transmits a signal through the transmission line.

18. A signal transmission circuit, comprising:
   a signal transmitting circuit having a control circuit for driving an input signal with a first power source voltage and a driver circuit for outputting the input signal driven by the control circuit in response to a voltage based on a second power source voltage lower than the first power source voltage;
   a transmission line;
   a signal receiving circuit to which the input signal is transmitted, the signal receiving circuit having an input impedance;
   a first terminal resistor terminating the transmission line, the first terminal resistor having the same value of resistance as a characteristic impedance of the transmission line, and the input impedance of the signal receiving circuit being larger than the resistance value of the first terminal resistor; and
   a second terminal resistor connected between a pair of output terminals of the signal transmitting circuit.

19. A signal transmission circuit as set forth in claim 18, wherein the second power source voltage is no more than half of the first power source voltage.

20. A signal transmission circuit as set forth in claim 18, further comprising a first power supply source for supplying the first power source voltage; and a second power supply source for supplying the second power source voltage.

21. A signal transmission circuit as set forth in claim 18, further comprising a first power supply source for supplying the first power source voltage; a second power supply source for supplying the second power source voltage; and a third power supply source applied to an input terminal of the signal receiving circuit and having a third power source voltage, the second power source voltage being higher than the third power source voltage.

22. A signal transmission circuit, comprising:
   a signal transmitting circuit having a control circuit for driving an input signal with a first power source voltage, and a driver circuit for outputting the input signal driven by the control circuit in response to a voltage based on a second power source voltage lower than the first power source voltage;
   a pair of transmission lines;
   a signal receiving circuit to which the input signal is transmitted through the transmission lines, the signal receiving circuit having an input impedance;
   a first terminal resistor terminating the pair of transmission lines, the first terminal resistor having the same value of resistance as a characteristic impedance of the pair of transmission lines and the input impedance of the signal receiving circuit being larger than the resistance value of the first terminal resistor; and
   first and second connecting resistors respectively connecting respective ones of the output terminals of the signal transmitting circuit to respective ones of the pair of transmission lines.

23. A signal transmission circuit as set forth in claim 22, further comprising a first power supply source for supplying the first power source voltage, and a second power supply source for supplying the second power source voltage.

24. A signal transmission circuit as set forth in claim 22, further comprising a first power supply source for supplying the first power source voltage, a second power supply source for supplying the second power source voltage, and a third power supply source, applied to an input terminal of the signal receiving circuit, for supplying a third power source voltage, the second power source voltage being higher than the third power source voltage.

25. A signal transmission circuit as set forth in claim 22, further comprising a second terminal resistor connected between said pair of output terminals of the signal transmitting circuit.

26. A signal transmission circuit, comprising:
   a signal transmitting circuit having a control circuit for driving an input signal with a first power source voltage, and a driver circuit for outputting the input signal driven by the control circuit with a voltage based on a second power source voltage lower than the first power source voltage;
   a first power supply source providing the first power source voltage;
   a signal receiving circuit to which the input signal is transmitted, the signal receiving circuit having first and second input terminals;
   a transmission line connecting the signal transmitting circuit to the first and second input terminals of the signal receiving circuit;
   a first resistor connecting the first power supply source to the first input terminal; and
   a second resistor having a first end for receiving a third power source voltage and a second end connected to the second input terminal.

27. A signal transmission circuit as set forth in claim 26, further comprising:
   a first power supply source, connected to the control circuit, for supplying the first power source voltage;
   a second power supply source, connected to the driver circuit, for supplying the second power source voltage; and
   a third power supply source, the second resistor connecting the third power supply source to the second input terminal.

28. A signal transmission circuit, comprising:
   a signal transmitting circuit having a control circuit for driving an input signal with a first power source voltage, a voltage drop circuit for producing a second power source voltage lower than the first power source voltage from the first power source voltage, and a driver circuit for outputting the input signal driven by the control circuit with a voltage based on the second power source voltage;
   a signal receiving circuit to which the input signal is transmitted, the signal receiving circuit having first and second input terminals; and
   a transmission line connecting the signal transmitting circuit to the signal receiving circuit.

29. A signal transmission circuit as set forth in claim 28, further comprising a first power supply source, connected to the control circuit for supplying the first power source voltage to the control circuit, the voltage drop circuit being connected to the driver circuit.

30. A signal transmission circuit as set forth in claim 28, further comprising a third power supply source applied to the an input terminal of the signal receiving circuit and having a third power source voltage, the second power source voltage being higher than the third power source voltage.

31. A signal transmission circuit, comprising:

- a signal receiving circuit to which an input signal is transmitted, the signal receiving circuit having an input impedance;
- a signal transmitting circuit having a control circuit for outputting an inverted or non-inverted input voltage in accordance with a first power source voltage applied thereto, and first and second pairs of push-pull type drivers for feeding an inverted or non-inverted output signal from the control circuit; and
- at least one transmission line coupled to the signal receiving circuit and the signal transmitting circuit;
- the first and second push-pull type drivers being responsive to a second power source voltage so as to transmit a pair of complementary transmission signals output from the control circuit to the at least one transmission line with a value in accordance with the second power source voltage.

* * * * *